US006754371B1

(12) United States Patent
Kondo et al.

(10) Patent No.: US 6,754,371 B1
(45) Date of Patent: Jun. 22, 2004

(54) METHOD AND APPARATUS FOR PAST AND FUTURE MOTION CLASSIFICATION

(75) Inventors: Tetsujiro Kondo, Kanagawa-Prefecture (JP); James J. Carrig, San Jose, CA (US); Yasuhiro Fujimori, Cupertino, CA (US); William Knox Carey, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/457,419

(22) Filed: Dec. 7, 1999

(51) Int. Cl.[7] .................................................. G06K 9/00
(52) U.S. Cl. ........................ 382/107; 348/700; 382/260
(58) Field of Search ................................ 382/103, 107, 382/218, 260–265, 236–238; 375/240.14; 348/416.1, 474, 607, 458, 699; 343/451; 358/133

(56) References Cited

U.S. PATENT DOCUMENTS

| | | | |
|---|---|---|---|
| 3,311,879 A | 3/1967 | Daher ........................ | 714/779 |
| 3,805,232 A | 4/1974 | Allen ........................ | 714/779 |
| 4,381,519 A | 4/1983 | Wilkinson et al. .......... | 348/617 |
| 4,419,693 A | 12/1983 | Wilkinson et al. .......... | 348/616 |
| 4,438,438 A * | 3/1984 | Arens et al. ................ | 343/451 |
| 4,532,628 A | 7/1985 | Matthews ...................... | 714/6 |
| 4,574,393 A | 3/1986 | Blackwell et al. .......... | 382/162 |
| 4,586,082 A | 4/1986 | Wilkinson ................... | 348/616 |
| 4,656,514 A | 4/1987 | Wilkinson et al. .......... | 348/616 |
| 4,675,735 A | 6/1987 | Wilkinson et al. .......... | 348/616 |
| 4,703,351 A | 10/1987 | Kondo ................... | 375/240.12 |
| 4,703,352 A | 10/1987 | Kondo ................... | 375/240.24 |
| 4,710,811 A | 12/1987 | Kondo ................... | 375/240.24 |
| 4,722,003 A | 1/1988 | Kondo ................... | 375/240.24 |
| 4,729,021 A | 3/1988 | Kondo ................... | 375/240.24 |
| 4,772,947 A | 9/1988 | Kondo ................... | 375/240.24 |

(List continued on next page.)

FOREIGN PATENT DOCUMENTS

| | | |
|---|---|---|
| EP | 0 558 016 | 2/1993 |
| EP | 0 610 587 | 12/1993 |
| EP | 0 592 196 A2 | 4/1994 |
| EP | 0 833 517 | 4/1998 |
| GB | 2 280 812 A | 2/1995 |
| JP | 7-67028 | 3/1995 |
| WO | WO 97/46019 | 12/1997 |
| WO | WO 00/48126 | 8/2000 |

OTHER PUBLICATIONS

Monet, et al., "Block Adaptive Quantization of Images", IEEE, 1993, vol. 41, No. 2.

Fure–Ching, et al., Concealment of Bit Error and Cell Loss in Inter–Frame Coded Video Transmission, IEEE, 1991, pp. 496–498.

Kondo, et al., "*Adaptive Dynamic Range Coding Scheme For A Digital VCR*", pp. 219–226.

Kim, et al., "*Bit Rate Reduction Algorithm For A Digital VCR*", IEEE Transactions on Consumer Electronics, vol. 37, No. 3, Aug. 1, 1992, pp. 267–274.

R.C. Gonzalez, et al., "*Digital Image Processing*", Addison Wesley Publishing Company, Inc., 1992, pp. 67–88.

R. Aravind, et al., "*Image and Video Coding Standards*", AT&T Technical Journal Jan./Feb. 1993, pp. 67–88.

Kondo,et al., "*Adaptive Dynamic Range Coding Scheme For Future HDTV Digital VTR*", Fourth International Workshop on HDTV and Beyond, Sep. 4–6, Turin, Italy.

(List continued on next page.)

*Primary Examiner*—Jayanti K. Patel
(74) *Attorney, Agent, or Firm*—Blakely, Sokoloff, Taylor & Zafman LLP (57) ABSTRACT

A method comprising determining a past motion class for target data, determining a future motion class for the target data, selecting one of the motion classes, filtering the target data using the selected motion class is disclosede.

27 Claims, 9 Drawing Sheets

U.S. PATENT DOCUMENTS

| | | | |
|---|---|---|---|
| 4,788,589 A | 11/1988 | Kondo | 375/240.12 |
| 4,807,033 A | 2/1989 | Keesen et al. | 348/616 |
| 4,845,560 A | 7/1989 | Kondo et al. | 375/240.12 |
| 4,890,161 A | 12/1989 | Kondo | 375/240.24 |
| 4,924,310 A | 5/1990 | von Brandt | 375/240.16 |
| 4,953,023 A | 8/1990 | Kondo | 375/240.03 |
| 4,975,915 A | 12/1990 | Sako et al. | 714/755 |
| 5,023,710 A | 6/1991 | Kondo et al. | 375/240.24 |
| 5,043,810 A * | 8/1991 | Vreeswijk et al. | 358/133 |
| 5,086,489 A | 2/1992 | Shimura | 382/238 |
| 5,093,872 A | 3/1992 | Tutt | 382/243 |
| 5,101,446 A | 3/1992 | Resnikoff et al. | 382/248 |
| 5,122,873 A | 6/1992 | Golin | 375/240.23 |
| 5,142,537 A | 8/1992 | Kutner et al. | 714/747 |
| 5,159,452 A | 10/1992 | Kinoshita et al. | 348/466 |
| 5,166,987 A | 11/1992 | Kageyama | 382/250 |
| 5,177,797 A | 1/1993 | Takenaka et al. | 382/234 |
| 5,185,746 A | 2/1993 | Tanaka et al. | 714/770 |
| 5,196,931 A | 3/1993 | Kondo | 375/240.24 |
| 5,208,816 A | 5/1993 | Seshardi et al. | 714/795 |
| 5,231,483 A * | 7/1993 | Sieber et al. | 358/125 |
| 5,231,484 A * | 7/1993 | Gonzales et al. | 375/240.04 |
| 5,237,424 A | 8/1993 | Nishino et al. | 386/40 |
| 5,243,428 A | 9/1993 | Challapali et al. | 348/607 |
| 5,247,363 A | 9/1993 | Sun et al. | |
| 5,258,835 A | 11/1993 | Kato | 375/240.12 |
| 5,307,175 A | 4/1994 | Seachman | 358/401 |
| 5,327,502 A | 7/1994 | Katata et al. | 382/239 |
| 5,337,087 A | 8/1994 | Mishima | 375/240.24 |
| 5,379,072 A | 1/1995 | Kondo | 348/441 |
| 5,398,078 A | 3/1995 | Masuda et al. | 348/699 |
| 5,400,076 A | 3/1995 | Iwamura | 375/240.15 |
| 5,416,651 A | 5/1995 | Uetake et al. | 360/48 |
| 5,416,847 A | 5/1995 | Boze | 381/94.3 |
| 5,428,403 A | 6/1995 | Andrew et al. | 348/699 |
| 5,434,716 A | 7/1995 | Sugiyama et al. | 360/32 |
| 5,455,629 A | 10/1995 | Sun et al. | 375/240.27 |
| 5,473,479 A | 12/1995 | Takakura | 360/48 |
| 5,481,554 A | 1/1996 | Kondo | 714/807 |
| 5,481,627 A | 1/1996 | Kim | 382/254 |
| 5,495,298 A | 2/1996 | Uchida et al. | 348/615 |
| 5,528,608 A | 6/1996 | Shimizume | 714/765 |
| 5,546,130 A | 8/1996 | Hackett et al. | 348/447 |
| 5,557,420 A | 9/1996 | Yanagihara et al. | 382/260 |
| 5,557,479 A | 9/1996 | Yanagihara | 360/32 |
| 5,568,196 A | 10/1996 | Hamada et al. | 348/416.1 |
| 5,577,053 A | 11/1996 | Dent | 714/755 |
| 5,579,051 A | 11/1996 | Murakami et al. | 375/240.03 |
| 5,598,214 A | 1/1997 | Kondo et al. | 375/240.14 |
| 5,617,135 A | 4/1997 | Noda et al. | 348/12 |
| 5,617,333 A | 4/1997 | Oyamada et al. | 709/247 |
| 5,625,715 A | 4/1997 | Trew et al. | 382/236 |
| 5,636,316 A | 6/1997 | Oku et al. | 386/112 |
| 5,649,053 A | 7/1997 | Kim | 704/229 |
| 5,671,018 A | 9/1997 | Ohara et al. | |
| 5,673,357 A | 9/1997 | Shima | 386/94 |
| 5,677,734 A | 10/1997 | Oikawa et al. | 375/240.04 |
| 5,699,475 A | 12/1997 | Oguro et al. | 386/109 |
| 5,724,099 A | 3/1998 | Hamdi et al. | 375/240.05 |
| 5,737,022 A | 4/1998 | Yamaguchi et al. | 375/240.15 |
| 5,751,862 A | 5/1998 | Williams et al. | 382/260 |
| 5,778,097 A * | 7/1998 | Nickerson | 382/236 |
| 5,790,195 A | 8/1998 | Ohsawa | 348/419.1 |
| 5,805,762 A | 9/1998 | Boyce et al. | 386/68 |
| 5,809,041 A | 9/1998 | Shikakura et al. | 714/747 |
| 5,809,231 A | 9/1998 | Yokoyama et al. | 709/200 |
| 5,835,163 A * | 11/1998 | Liou et al. | 348/700 |
| 5,852,470 A | 12/1998 | Kondo et al. | 348/448 |
| 5,861,922 A | 1/1999 | Murashita et al. | 375/240.24 |
| 5,883,983 A * | 3/1999 | Lee et al. | 382/268 |
| 5,894,526 A * | 4/1999 | Watanabe et al. | 382/236 |
| 5,903,672 A * | 5/1999 | Yu | 382/236 |
| 5,928,318 A | 7/1999 | Araki | 708/650 |
| 5,936,674 A | 8/1999 | Kim | 375/240.24 |
| 5,940,539 A | 8/1999 | Kondo et al. | 382/236 |
| 5,946,044 A | 8/1999 | Kondo et al. | 348/456 |
| 5,991,447 A * | 11/1999 | Eifrig et al. | 382/236 |
| 6,018,317 A | 1/2000 | Dogan et al. | 342/378 |
| 6,057,892 A * | 5/2000 | Borer | 348/699 |
| 6,067,636 A | 5/2000 | Yao et al. | 714/15 |
| 6,104,434 A | 8/2000 | Nakagawa et al. | 378/240 |
| 6,137,915 A | 10/2000 | Chai | 382/240 |
| 6,151,416 A | 11/2000 | Kondo et al. | 382/261 |
| 6,164,540 A | 12/2000 | Bridgelall et al. | 235/462.01 |
| 6,192,079 B1 | 2/2001 | Sharma et al. | 378/240.16 |
| 6,192,161 B1 | 2/2001 | Kondo et al. | 382/261 |

OTHER PUBLICATIONS

Kondo, et al., *"A New Concealment Method For Digital VCR's"*, IEEE Visual Signal Processing and Communication, pp. 20–22, 9/93, Melbourne, australia.

Park, et al., *"A Simple Concealment For ATM Bursty Cell Loss"*, IEEE transactions of Consumer Electronics, No. 3, Aug. 1993, pp. 704–709.

NHK Laboratories Note, *"Error Correction, Concealment and Shuffling"*, No. 424, Mar. 1994, pp. 29–44.

Meguro, et al., *"An Adaptive Order Statistics Filter Based On Fuzzy Rules For Image Processing"*, pp. 70–80, XP-00755627 Scripta Technica, Inc.

Japanese Patent No. 05304659 and translation of Abstract.
Japanese Patent No. 05244578 and translation of Abstract.
Japanese Patent No. 05300485 and translation of Abstract.
Japanese Patent No. 06070298 and translation of Abstract.
Japanese Patent No. 06006778 and translation of Abstract.
Japanese Patent No. 06113256 and translation of Abstract.
Japanese Patent No. 06113275 and translation of Abstract.
Japanese Patent No. 06253287 and translation of Abstract.
Japanese Patent No. 06253280 and translation of Abstract.
Japanese Patent No. 06253284 and translation of Abstract.
Japanese Patent No. 06350981 and translation of Abstract.
Japanese Patent No. 06350982 and translation of Abstract.
Japanese Patent No. 08317394 and translation of Abstract.
Japanese Patent No. 07023388 and translation of Abstract.
Japanese Patent No. 04245881 and translation of Abstract.
Japanese Patent No. 04115628 and translation of Abstract.
Japanese Patent No. 04115686 and translation of Abstract.
Translation of Abstract of Japanese Patent No. 61147690.
Translation of Abstract of Japanese Patent No. 63256080.
Translation of Abstract of Japanese Patent No. 63257390.
Translation of Abstract of Japanese Patent No. 02194785.
Translation of Abstract of Japanese Patent No. 03024885.
Translation of Abstract of Japanese Patent No. 04037293.
Translation of Abstract of Japanese Patent No. 04316293.
Translation of Abstract of Japanese Patent No. 04329088.
Translation of Abstract of Japanese Patent No. 05047116.
Translation of Abstract of Japanese Patent No. 05244579.
Translation of Abstract of Japanese Patent No. 05244580.
Translation of Abstract of Japanese Patent No. 05244559.
Translation of Abstract of Japanese Patent No. 05304659.
Translation of Abstract of Japanese Patent No. 06086259.
Translation of Abstract of Japanese Patent No. 06113258.
Translation of Abstract of Japanese Patent No. 06125534.
Translation of Abstract of Japanese Patent No. 06162693.
Translation of Abstract of Japanese Patent No. 06253287.
Translation of Abstract of Japanese Patent No. 06253280.
Translation of Abstract of Japanese Patent No. 06253284.

Translation of Abstract of Japanese Patent No. 07046604.
Translation of Abstract of Japanese Patent No. 07085611.
Translation of Abstract of Japanese Patent No. 07095581.
Translation of Abstract of Japanese Patent No. 07177505.
Translation of Abstract of Japanese Patent No. 07177506.
Translation of Abstract of Japanese Patent No. 07240903.
Ozkan, M.K., et al. Adaptive Motion–Compensated Filtering Of Noisy Image Sequences; IEEE Transactions on P. 277–290. Aug. 1993 vol. 3, Issue 4.
Sezan, et al. "Temporally Adaptive Filtering Of Noisy Image Sequences Using A Robust Motion Estimation Algorithm"; 1991 International Conference on p. 2429–2432 vol. 4, Apr. 14–17, 1991.
Crinon, R.J., et al. "Adaptive Model–Based Motion Estimation"; IEEE Transactions on p. 469–481, vol. 3, Issue 5, Sep. 1994.
Wollborn, M. Prototype Prediction For Colour Update In Object–Based Analysis–Synthesis Coding; IEEE Transactions on p. 236–245, vol. 4, No. 3, Jun. 1994.

Patti, A.J., et al., Robust Methods For High–Quality Stills From Interlaced Video In the Presence Of Dominant Motion; IEEE Transactions on p. 328–342, vol. 7, No. 2, Apr. 1997.
Robert, P., Motion Compensation Interpolation Considering Occluding, Appearing and Disappearing Areas, Signal Processing of HDTV, 3. Turin, Sep. 4–6, 1991, Proceedings of the International Workshop on HDTV and Beyond, Amsterdam, Elsevier, NL, vol Workshop 4, Sep. 4, 1991, pp. 329–341.
International Search Report PCT/US00/23035, 5 pgs., Jan. 22, 2001.
International Search Report PCT/00/25223, 7 pages, Dec. 7, 2000.
Meguro, et al., "*An Adaptive Order Statistics Filter Based On Fuzzy Rules For Image Processing*", p. 70–80, © 1997 Scripta Technica, Inc.

* cited by examiner

FIG. 9

METHOD AND APPARATUS FOR PAST AND FUTURE MOTION CLASSIFICATION

FIELD OF THE INVENTION

This invention relates generally to the processing of image, sound or other correlated signals, and more particularly, to a method, apparatus, and article of manufacture for past and future motion classification.

BACKGROUND OF THE INVENTION

Conventionally, error recovery has been achieved by correlation evaluation. For example, some recovery choices have been implemented using a conventional error pixel recovery method. Using neighboring data, spatial inclinations of the target data are detected. For example, the inclinations regarding four directions are evaluated according to the predetermined formulae which use the neighboring data. An interpolation filter is chosen where the inclination value, $E_i$, is the smallest among the four values calculated. In addition to the spatial inclination, a motion factor is also evaluated for error recovery. In the case of the motion area, a selected spatial filter is used for error recovery. On the other hand, the previous frame data at the same location as the target data typically are used for error recovery.

The conventional error recovery process discussed above may cause many serious degradations on changing data, especially on object edges. Actual signal distribution typically varies widely, so these problems are likely to occur. Therefore, there is a need for a way to restore a deteriorated signal to an undeteriorated signal which minimnizes degradations on changing data.

SUMMARY OF THE INVENTION

A method comprising determining a past motion class for target data, determining a future motion class for the target data, selecting one of the motion classes, and filtering the target data using the selected motion class is disclosed.

BRIEF DESCRIPTION OF THE DRAWINGS

The present invention is illustrated by way of example and may be better understood by referring to the following description in conjunction with the accompanying drawings, in which like references indicate similar elements and in which.

alit

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

A method and apparatus for past and future motion classification is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be a circuit or system specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Classified adaptive error recovery is a technology which utilizes classified adaptive filter processing. A proper classification with respect to the deteriorated input signal is performed according to the input signal characteristics. An adaptive filter is prepared for each class prior to error recovery processing.

More than one classification method may optionally be used to generate the plurality of classes. Generated classes may include a motion class, an error class, a spatial activity class or a spatial class. An adaptive class tap structure may optionally be used to generate the plurality of classes. An adaptive filter tap structure may optionally be used according to the class which is detected in each deteriorated input signal. The adaptive filter tap structure may optionally be expanded based upon multiple taps. The number of filter coefficients that must be stored can be reduced by allocating the same coefficient to multiple taps. This process is referred to as filter tap expansion. The deteriorated input signal may optionally be modified by preprocessing peripheral erroneous data. A spatial class may optionally be eliminated according to a spatial class elimination formula.

The present invention can be applied to any form of temporally correlated data, including without limitation, video or other two-dimensional moving images, and three-dimensional moving images, and audio such as stereo. In the description, the term value, in one embodiment, may refer to a component within a set of received or generated data. Furthermore, a data point may be a position, place, instance, location or range within data.

For the sake of clarity, some of the description herein focuses on video data comprising a pixel stream. However, it will be recognized that the present invention may be used with other types of data other than video data and that the terms and phrases used herein to describe the present invention cover a broad range of applications and data types. For example, an adaptive class tap structure is an adaptive structure for class tap definition used in multiple classification. A spatial class, a motion class and an error class may be used to define the structure. An adaptive filter tap structure is an adaptive structure for filter tap definition based upon a corresponding class.

A class may be defined based on one or more characteristics of the target data. For example, a class may also be defined based on one or more characteristics of the group containing the target data. A class ID is a specific value within the class that is used to describe and differentiate the target data from other data with respect to a particular characteristic. A class ID may be represented by a number, a symbol, or a code within a defined range. A parameter may be used as a predetermined or variable quantity that is used in evaluating, estimating, or classifying the data. For example, the particular motion class ID of a target data can be determined by comparing the level of motion quantity in the block containing the target data against a parameter which can be a pre-determined threshold.

A motion class is a collection of specific values used to describe the motion characteristic of the target data. In one embodiment, the motion class may be defined based on the different levels of motion of the block containing the target data, for example, no motion in the block, little motion in the block, or large motion in the block. A motion class ID is a specific value within the motion class used to indicate a particular level of motion quantity of the target data. For example, motion class ID of "0" may be defined to indicate no motion, motion class ID of "3" may be defined to indicate large motion.

The present invention provides a method and apparatus for adaptive processing that generates data corresponding to a set of one or more data classes. This process is known as "classification." Classification can be achieved by various attributes of signal distribution. For example, Adaptive Dynamic Range Coding (ADRC) may be used for generation of each class as a spatial class, but it will be recognized by one of ordinary skill in the art that other classes, including a motion class, an error class, and a spatial activity class may be used with the present invention without loss of generality.

For each class, a suitable filter for signal restoration is prepared for the adaptive processing. In one embodiment, each filter may be represented by a matrix of filter coefficients which are applied to the data. The filter coefficients can be generated by a training process, an example of which is described subsequently, that occurs as a preparation process prior to filtering.

Figure 1A:
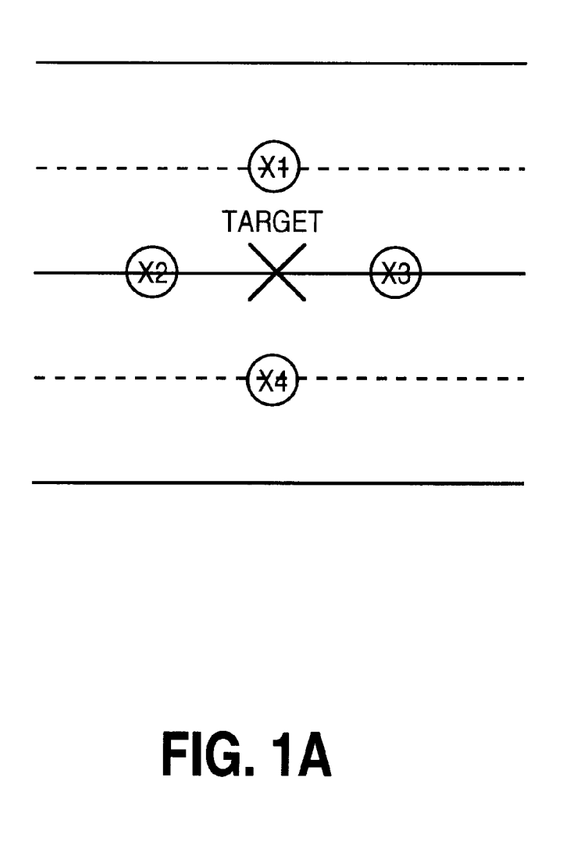
FIGS. 1A and 1B illustrate one embodiment of a classified adaptive error class.
Figure 1B:
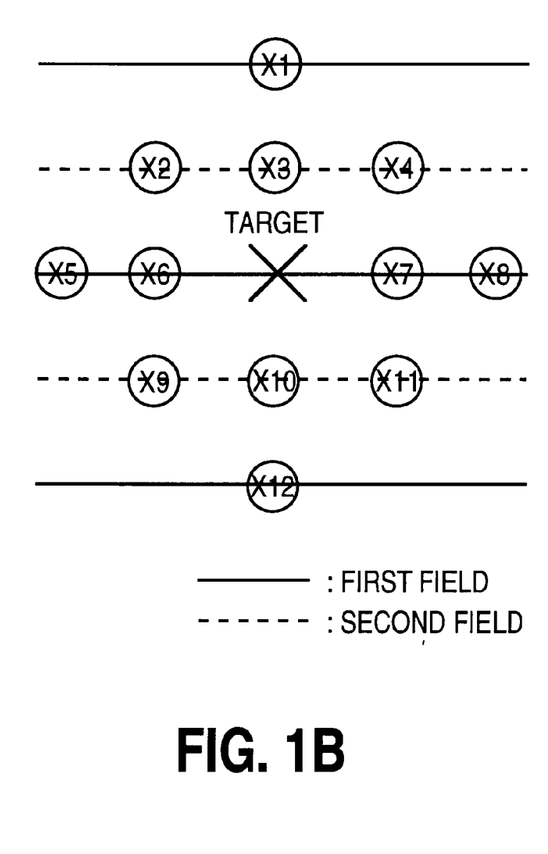

In FIG. 1A, an example is shown where the number of class taps is four. In the case of 1-bit ADRC, 16 class IDs are available as given by [formula 3], shown below. ADRC is realized by [formula 2], shown below. Detecting a local dynamic range (DR) is given by [formula 1], shown below, $$q_i = \left\lfloor \frac{(x_i - \text{MIN} + 0.5) \cdot 2^Q}{DR} \right\rfloor \quad \text{[formula 2]}$$

$$c = \sum_{i=1}^{4} 2^{i-1} \cdot q_i \quad \text{[formula 3]}$$

where c corresponds to an ADRC class ID, DR represents the dynamic range of the four data area, MAX represents the maximum level of the four data, MIN represents the minimum level of the four data, $q_i$ is the ADRC encoded data, also referred to as a Q code, and Q is the number of quantization bits. The $\lfloor \cdot \rfloor$ operator represents a truncation operation.

In 1-bit ADRC with four class taps, c may have a value from 0 to 15 with Q=1. This process is one type of spatial classification, but it will be recognized by one of ordinary skill in the art that other examples of spatial classification, including Differential PCM, Vector Quantization and Discrete Cosine Transform may be used with the present invention without loss of generality. Any method may be used if it can classify a target data distribution.

Figure 2:
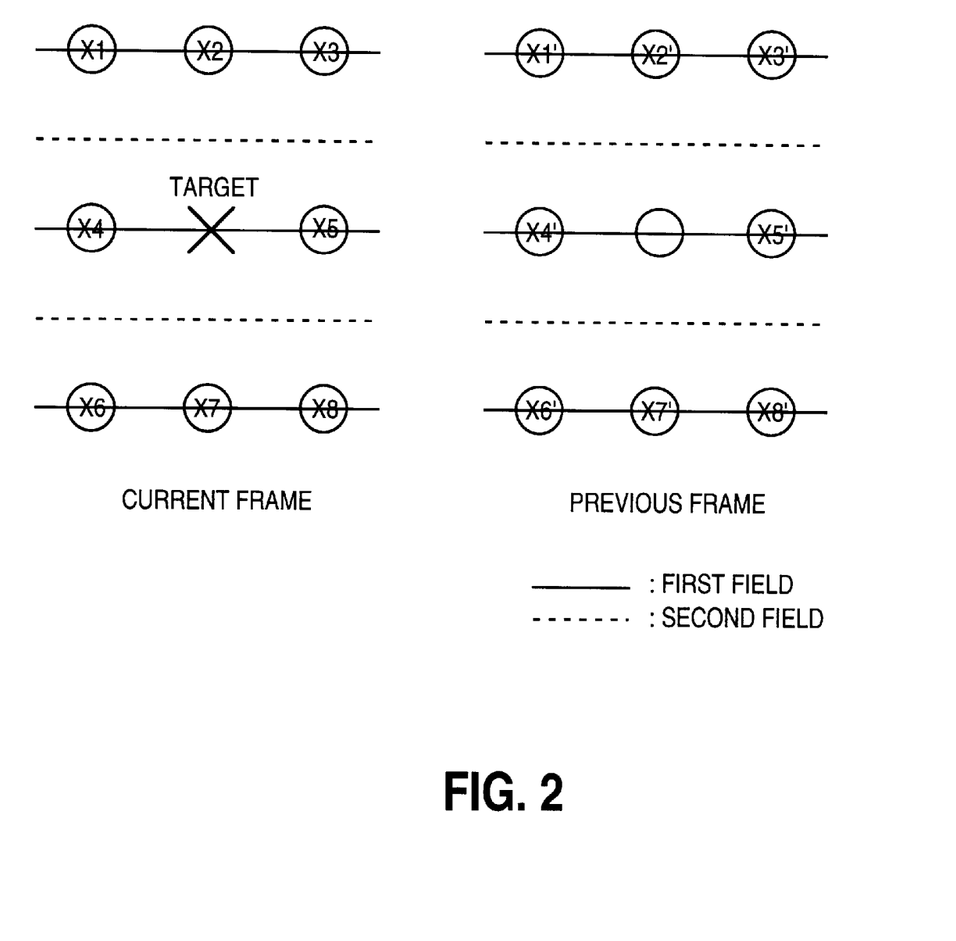
FIG. 2 illustrates one example of motion class tap structures.

In the example shown in FIG. 2B, each adaptive filter has 12 taps. Output data is generated according to the linear combination operation given by [formula 4], shown below, $$y = \sum_{i=1}^{12} w_i \cdot x_i \quad \text{[formula 4]}$$

where $x_i$ is input data, $w_i$ corresponds to each filter coefficient, and y is the output data after error recovery. Filter coefficients can be generated for each class ID by a training process that occurs prior to the error recovery process.

As noted above, filter coefficients can be generated by a training process. For example, training may be achieved according to the following criterion:

$$\min_w \|X \cdot W - Y\|_2 w \quad \text{[formula 5]}$$

where X, W, and Y are, for example, the following matrices: X is the input data matrix defined by [formula 6], W is the coefficient matrix defined by [formula 7], and Y corresponds to the target data matrix defined by [formula 8].

$$X = \begin{pmatrix} x_{11} & x_{12} & \cdots & x_{1n} \\ x_{21} & x_{22} & \cdots & x_{2n} \\ \vdots & \vdots & \ddots & \vdots \\ x_{m1} & x_{m2} & \cdots & x_{mn} \end{pmatrix} \quad \text{[formula 6]}$$

$$W = \begin{pmatrix} w_1 \\ w_2 \\ \vdots \\ w_n \end{pmatrix} \quad \text{[formula 7]}$$

$$Y = \begin{pmatrix} y_1 \\ y_2 \\ \vdots \\ y_m \end{pmatrix} \quad \text{[formula 8]}$$

The coefficient $w_i$ can be obtained according to [formula 5], so that estimation errors against target data are minimized.

In another embodiment of the present invention, motion classification, in addition to spatial classification, may also be used to provide compact definition of temporal characteristics. Further, multiple classification may be added to the classified adaptive error recovery method. As noted above, there are various types of classes, such as a motion class, an error class, a spatial activity class and a spatial class. The combination of one or more of these different classification methods can also improve classification quality.

FIG. 2 shows an example of motion class tap structures. The example shows eight taps in neighborhood of the target error data. In this example, the eight tap accumulated temporal difference can be evaluated according to [formula 9], shown below, and is classified to four kinds of motion classes by thresholding based on [formula 10], shown below. In one embodiment of the present invention, th0 is equal to 3, th1 is equal to 8, and th2 is equal to 24.

$$fd = \sum_{i=1}^{8} |x_i - x'_i| \quad \text{[formula 9]}$$

$$mc = \begin{cases} 0 & (0 \le fd < th0) \\ 1 & (th0 \le fd < th1) \\ 2 & (th1 \le fd < th2) \\ 3 & (th2 \le fd) \end{cases} \quad \text{[formula 10]}$$

In the above formulas, fd represents an accumulated temporal difference, $X_i$ represents motion class tap data of the current frame, $x'_i$ represents the previous frame tap data corresponding to the current frame, and mc represents a motion class ID. Three thresholds, th0, th1, th2, can be used for this motion classification.

Adaptive filtering systems may use motion classification to select the appropriate filtering technique. This motion classification may include comparing past and present input data to determine an estimate of an object's motion around the pixels of interest. By adding a processing delay to an image filtering system, future data may also be compared with present data and used for motion classification, detection and filtering.

Having both past motion classification and future motion classification may improve the filtering results, particularly in areas of appearing stationary pixels where there was past motion but no future motion. The filtering technique based on past and future motion classification may be used for up conversion or pixel recovery.

Figure 3A:
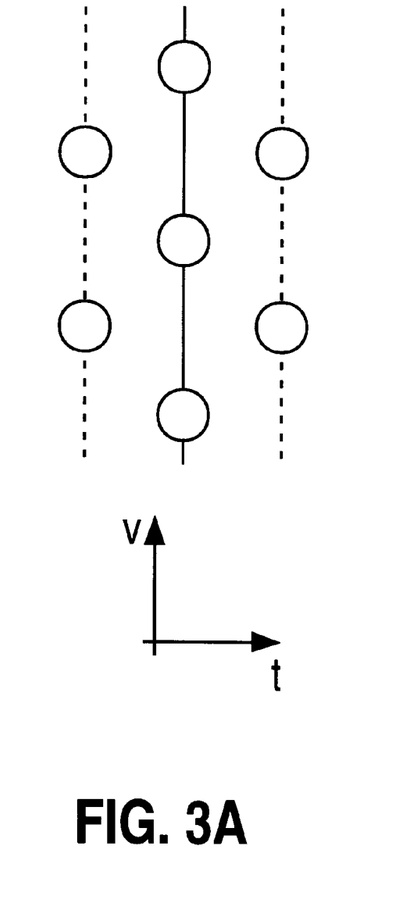
FIGS. 3A and 3B show an example of an interlaced video.
Figure 3B:
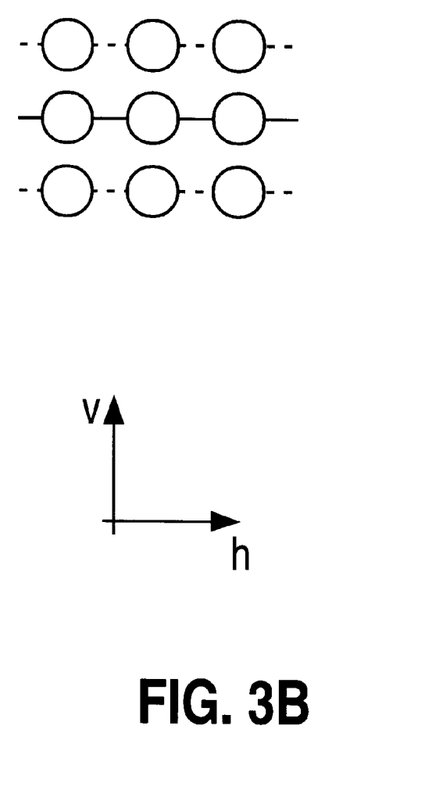

Interlacing two fields to create one frame of an image has an effect on the vertical resolution of an image. In interlaced video systems, only every other line of data is from the current field, as shown in FIGS. 3A and 3B. The highest resolution processing modes rely on pastor future data to fill in remaining lines.

When filtering the pixels of a fast moving object only the current field information is safe to use, unless an expensive motion compensation method is provided. Because past or future data for a given location may not be accurate when filtering the fast moving object, the highest resolution processing modes are not available. This may reduce the vertical resolution of the fast moving object by as much as fifty percent.

If the object moves fast enough, the loss of vertical resolution may not be perceived by the human eye. However, a degradation may be noticed when appearing or disappearing pixels are treated as motion pixels.

For purposes of discussion, on herein, an appearing pixel may be defined as a pixel belonging to a background object that appears as the result of being no longer occluded by a foreground object. Conversely, a disappearing pixel may be defined as a pixel belonging to a background object that is occluded by a foreground object.

Figure 4A:
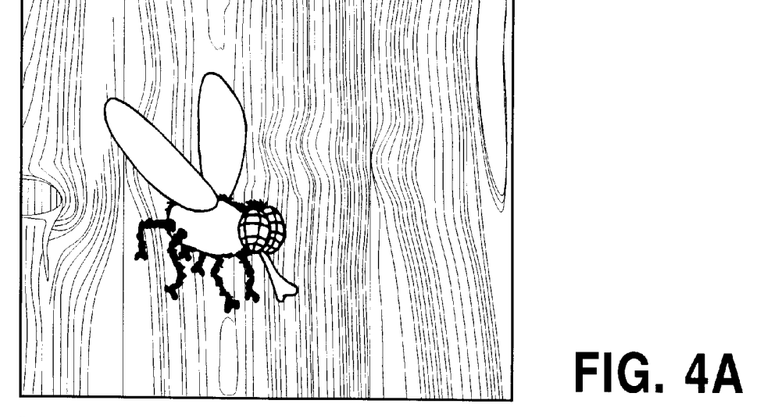
FIGS. 4A, 4B, and 4C show an example of three consecutive fields of video.
Figure 4B:
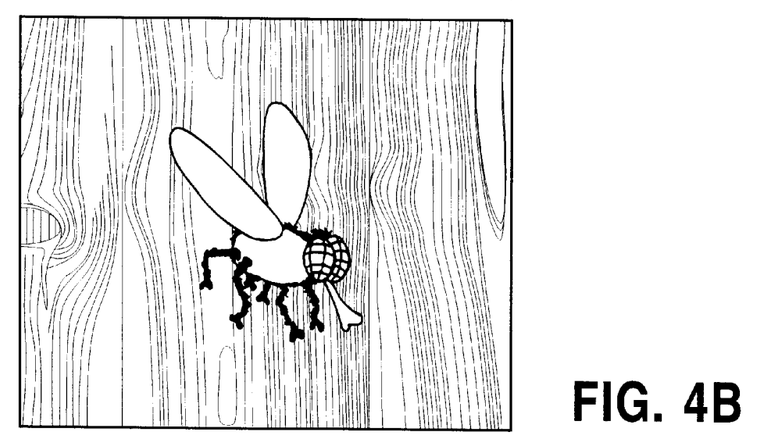
Figure 4C:
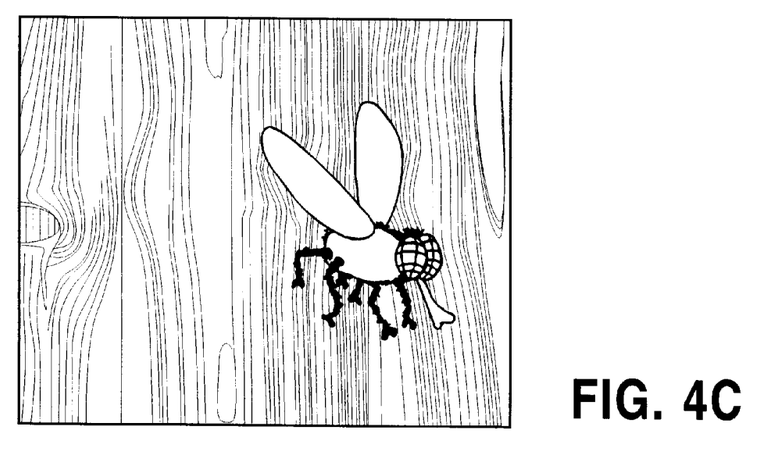

An example of the visual effects of treating appearing and disappearing pixels as motion pixels is provided with respect to FIGS. 4A, 4B, and 4C, which show three consecutive fields of video. The sequence shows a cartoon fly quickly crossing a wooden background from left to right.

Figure 5:
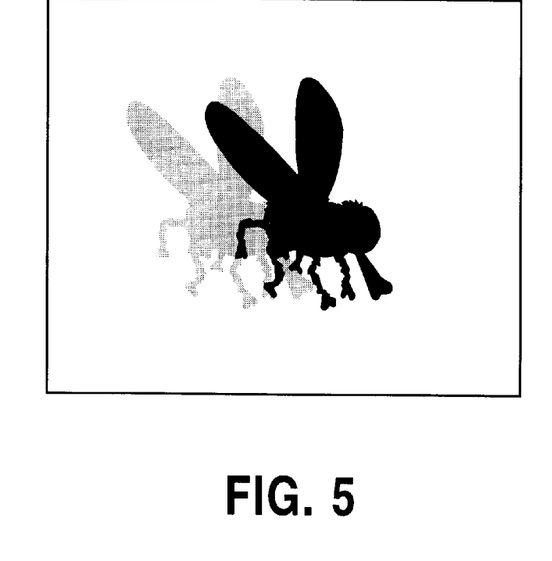
FIG. 5 shows one example of motion degradation for appearing pixels.

For example, the motion of the fly from the past position of FIG. 4A to the present position of FIG. 4B may create a low resolution cloud that follows the fly, as shown in FIG. 5. The black and gray shaded areas of FIG. 5 shown the pixels that are classified as motion when the motion class is determined by comparing past and present data for the given area.

The black areas show the moving foreground object, which may be processed by using only one field. The gray area shows the appearing pixels which are highly correlated with present data, but not with past data. In future frames, these pixels may be processed using two field data.

If the pixels in the gray region are presently classified as motion, they will be processed using only one field. As a result, the viewer may notice a change in resolution with respect to the appearing pixels. The degraded resolution of the appearing pixels will form a low resolution cloud that follows the fly.

Figure 6:
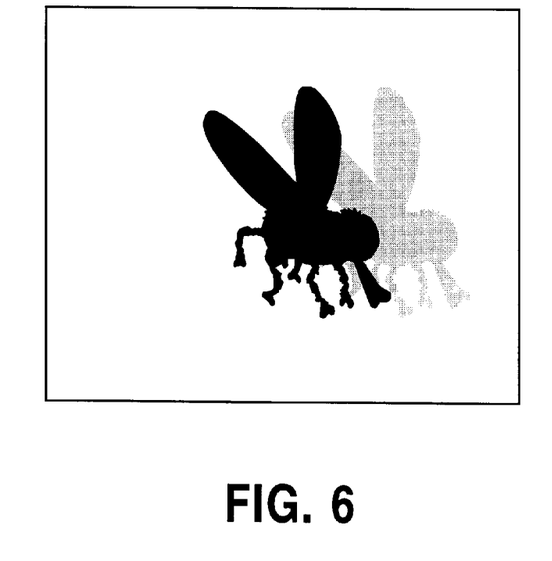
FIG. 6 shows one example of motion degradation for disappearing pixels.

A similar problem may occur if only the present and future data of FIGS. 4B and 4C are used, as shown in FIG. 6. The black area of FIG. 6 is the moving foreground object, which may be processed using only one field. The gray area shows the disappearing pixels, which are highly correlated with future data but not with present data. If the disappearing pixels are classified as motion pixels, they will be processed using one field data. The result will be a decrease in the resolution of the disappearing pixels, which form a low resolution cloud that precedes the fly.

Figure 7A:
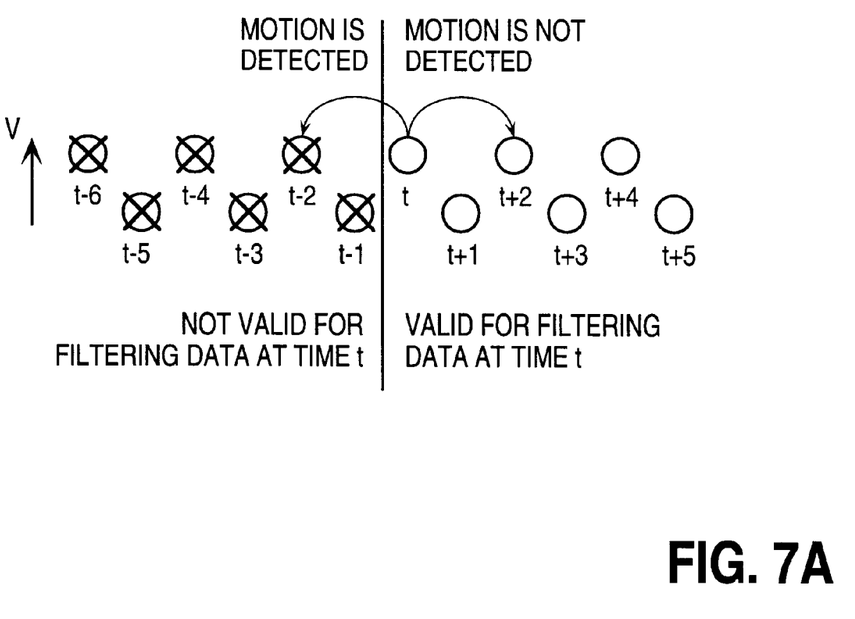
FIGS. 7A and 7B show examples of a filter for past and future data.
Figure 7B:
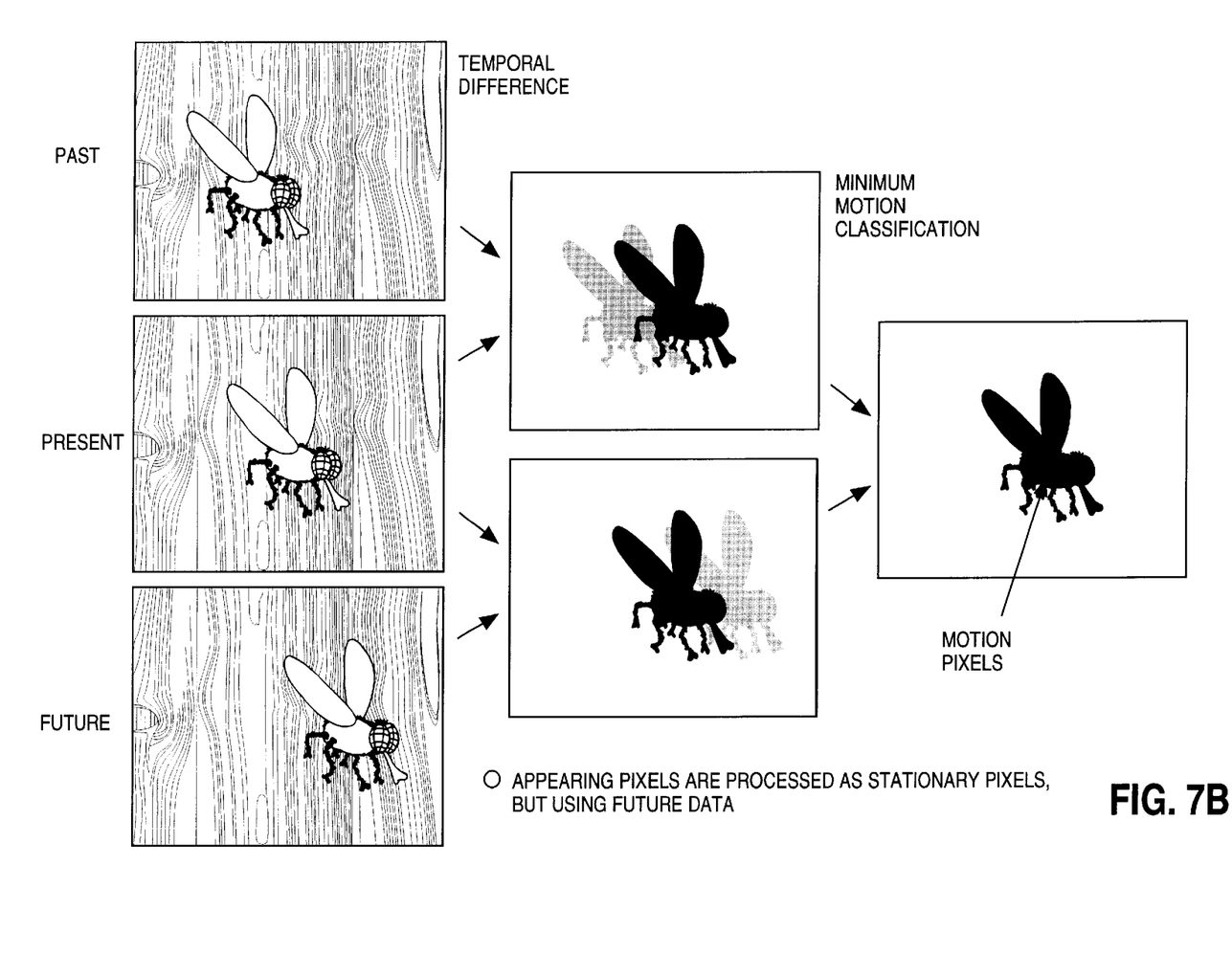

The past and future data of FIGS. 4A and 4C can be used along the present data of FIG. 4B to classify image pixels as stationary, appearing, disappearing, or motion. Within the motion class, different sub-classifications, such as speed or direction, may be included. By comparing past and future data to present data, the image can be filtered using the data which is more closely correlated to the present data, as shown in FIG. 7A. Stationary and disappearing pixels may be filtered using past and present field data and appearing pixels may be filtered using present and future field data, as shown in FIG. 7B. Other motion subcategories may be processed using one field or multiple field filters.

Figure 8:
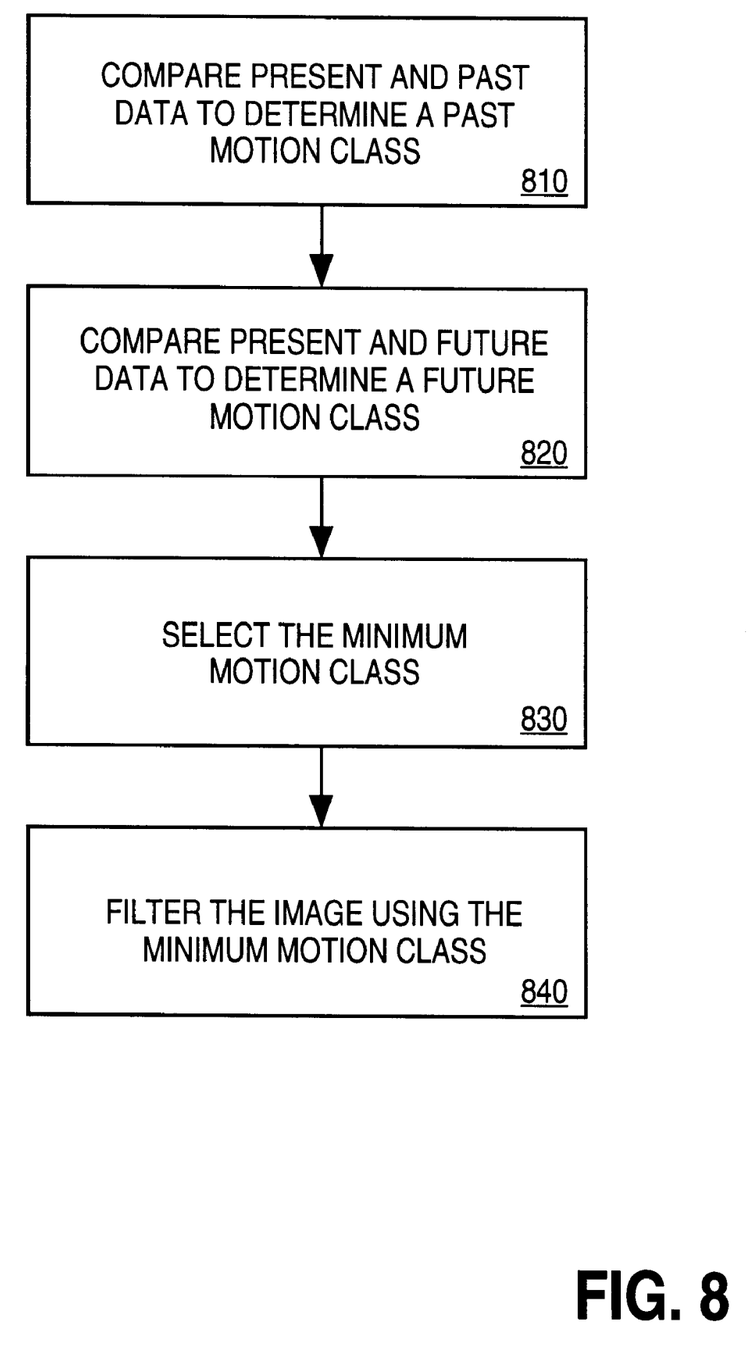
FIG. 8 shows one embodiment of a method for minimum motion classification.

FIG. 8 shows an embodiment of a method for minimum motion classification. Present data is compared to past data to determine a past motion class, 810. Present data is compared to future data to determine a future motion class, 820. The minimum motion class is determined by selecting the motion class that is highly correlated to the present data, 830. The image is filtered using the minimum motion class 840.

For example, if the present motion class is less than the future motion class then only past and present data are used in the filter. Alternatively, if the future motion class is less than the past motion class, then only present and future data are used in the filter.

For example, if motion is classified into four speeds, then the forward motion class (FMC) may be expressed as $$FMC \in \{0,1,2,3\}$$

The backward motion class (BMC) may be expressed as $$BMC \in \{0,1,2,3\}$$

The minimum motion class (MMC) is $$MMC = \min\{FMC, BMC\}$$

The minimum motion direction detected is

{Forward if FMC <BMC, else backwards}

An embodiment of the data used to filter an image for given values of BCM and FMC is provided in Table 1.

TABLE 1

| Backwards Motion Class | Forwards Motion Class | Use past data | Use present data | Use future data |
|---|---|---|---|---|
| 0 | 0 | ✓ | ✓ | |
| 0 | 1 | ✓ | ✓ | |
| 0 | 2 | ✓ | ✓ | |
| 0 | 3 | ✓ | ✓ | |
| 1 | 0 | | ✓ | ✓ |
| 1 | 1 | ✓ | ✓ | |
| 1 | 2 | ✓ | ✓ | |
| 1 | 3 | ✓ | ✓ | |
| 2 | 0 | | ✓ | ✓ |
| 2 | 1 | | ✓ | ✓ |
| 2 | 2 | ✓ | ✓ | |
| 2 | 3 | ✓ | ✓ | |
| 3 | 0 | | ✓ | ✓ |
| 3 | 1 | | ✓ | ✓ |

TABLE 1-continued

| Backwards Motion Class | Forwards Motion Class | Use past data | Use present data | Use future data |
|---|---|---|---|---|
| 3 | 2 | | ✓ | ✓ |
| 3 | 3 | | ✓ | |

Figure 9:
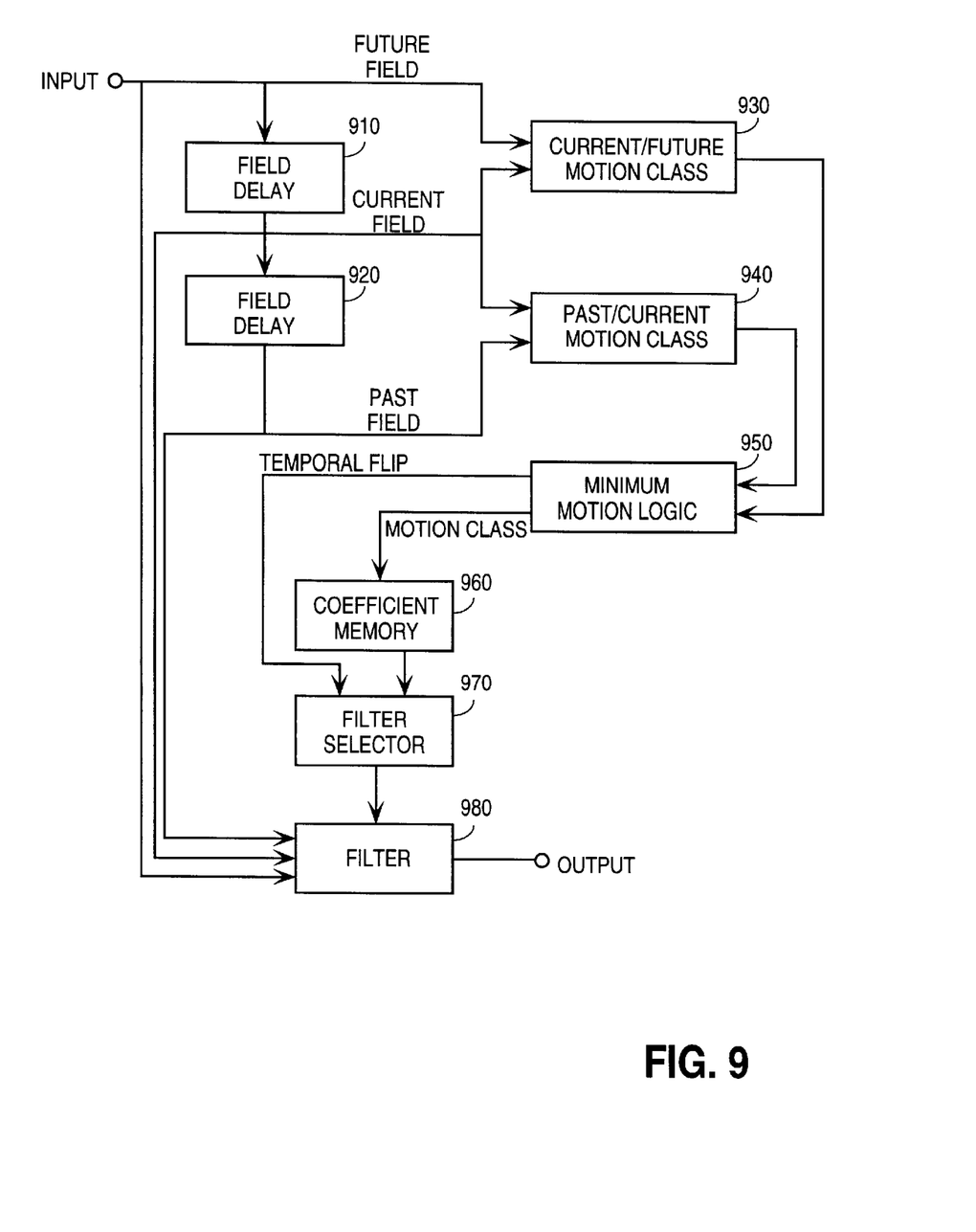
FIG. 9 shows one embodiment of an apparatus for performing minimum motion filtering.

An apparatus for performing the method of minimum motion filtering is show in FIG. 9. Image data including past, present and future data are input to fields lays 910 and 920. The present and future data is input into the future motion class detector 930. The present and future data are compared by the detector 930 to create a future motion class. The present and past data are input to a past motion class detector 940, and a past motion class is created. The past and future motion classes are input to minimize motion logic 950, and one of the classes is selected as the minimum motion class. The selected motion class is input to coefficient memory 960. An appropriate set of coefficients are selected and a filter is selected 970 and provided to filter 980, where the range is filtered.

In one embodiment, the method and apparatus for past and future motion classification may be used to perform pixel error recovery. In an alternative embodiment, the method and apparatus for past and future motion classification may be used to perform up-conversion.

While the invention is described in terms of embodiments in a specific system environment, those of ordinary skill in the art will recognize that the invention can be practiced, with modification, in other and different hardware and software environments within the spirit and scope of the appended claims.

What claimed is:

1. A method comprising:
   determining a past motion class for target data;
   determining a future motion class for the target data;
   selecting one of the past and future motion classes; and
   filtering the target data using a classified adaptive filter associated with the selected motion class.

2. The method of claim 1 wherein determining the past motion class comprises comparing present data with past data.

3. The method of claim 1 wherein determining the future motion class.: comprises comparing present data with future data.

4. The method of claim 1 wherein selecting comprises selecting a minimum of the future class and past class.

5. The method of claim 1 wherein if the past motion class is less than or equal to the future motion class, then the past motion class is the selected motion class.

6. The method of claim 1 wherein if the future motion class is less than the past motion class, then the future motion class is the selected motion class.

7. The method of claim 1 wherein the filters associated with the future motion class are temporally symmetric to those associated with the past motion class.

8. A computer readable medium containing instructions which, when executed by a processing system, cause the system to perform:
   determining a past motion class for target data;
   determining a future motion class for the target data;
   selecting one of the past and future motion classes; and
   filtering the target data using a classified adaptive filter associated with the selected motion class.

9. The medium of claim 8 wherein determining the past motion class comprises comparing present data with past data.

10. The medium of claim 8 wherein determining the future motion class comprises comparing present data with future data.

11. The medium of claim 8 wherein selecting comprises selecting a minimum of the future class and past class.

12. An apparatus comprising:

means for determining a past motion class for target data;

means for determining a future motion class for the target data;

means for selecting one of the past and future motion classes; and means for filtering the target data using a classified adaptive filter associated with the selected motion class.

13. The apparatus of claim 12 wherein means for determining the past motion class comprises means for comparing present data with past data.

14. The apparatus of claim 12 wherein means for determining the future motion class comprises means for comparing present data with future data.

15. The apparatus of claim 12 wherein means for selecting comprises means for selecting a minimum of the future class and past class.

16. A system comprising:

past motion class logic configured to determine a past motion class for target data;

future motion class logic configured to determine a future motion class for the target data;

minimum motion class logic configured to select logic to select one of the motion classes; and filtering logic configured to filter the target data using a classified adaptive filter associated with the selected motion class.

17. The apparatus of claim 16 wherein determining logic to determine the past motion class comprises comparing logic configured to compare present data with past data.

18. The apparatus of claim 16 wherein determining logic to determine the future motion class comprises comparing logic configured to compare present data with future data.

19. The apparatus of claim 16 wherein selecting logic comprises logic configured to select a minimum of the future class and past class.

20. A method comprising:

determining a past motion class for target data of a frame using a previous frame data;

determining a future motion class for the target data using a subsequent frame data;

selecting one of the past and future motion classes; and filtering the target data using a classified adaptive filter associated with the selected motion class.

21. The method of claim 20, wherein determining the past motion class comprises comparing present frame data with the previous frame data and determining the future motion class comprises comparing present frame data with the subsequent frame data.

22. The method of claim 21, wherein selecting comprises selecting a minimum of the future motion class and past motion class.

23. The method of claim 20, wherein the filters associated with the future motion class are temporally symmetric to those associated with the past motion class.

24. A computer readable medium containing instructions which, when executed by a processing system, cause the system to perform:

determining a past motion class for target data of a frame using a previous frame data;

determining a future motion class for the target data using a subsequent frame data;

selecting one of the past and future motion classes; and filtering the target data using a classified adaptive filter associated with the selected motion class.

25. The medium of claim 24, wherein determining the past motion class comprises comparing present frame data with the previous frame data and determining the future motion class comprises comparing present frame data with the subsequent frame data.

26. A system comprising:

past motion class logic configured to determine a past motion class for target data of a frame using a previous frame data;

future motion class logic configured to determine a future motion class for the target data using a subsequent frame data;

minimum motion class logic configured to select one of the past and future motion classes; and filtering logic configured to filter the target data using a classified adaptive filter associated with the selected motion class.

27. The system of claim 26, wherein the past motion class logic configured to determine the past motion class comprises comparing logic configured to compare present frame data with the previous frame data and the future motion class logic configured to determine the future motion class comprises comparing logic configured to compare present frame data with the subsequent frame data.

* * * * *